United States Patent
Solomon et al.

(10) Patent No.: US 9,016,117 B2
(45) Date of Patent: Apr. 28, 2015

(54) TIRE MONITORING APPARATUS, SYSTEM AND METHOD OF USING THE SAME

(71) Applicants: Yuval Solomon, Givat Shmuel (IL); Zvi Borowitsh, Herzlia (IL); Asi Ben-Shach, Herzaliya (IL); David Gil, Mevaseret-Zion (IL)

(72) Inventors: Yuval Solomon, Givat Shmuel (IL); Zvi Borowitsh, Herzlia (IL); Asi Ben-Shach, Herzaliya (IL); David Gil, Mevaseret-Zion (IL)

( * ) Notice: Subject to any disclaimer, the term of this patent is extended or adjusted under 35 U.S.C. 154(b) by 26 days.

(21) Appl. No.: 13/830,610

(22) Filed: Mar. 14, 2013

(65) Prior Publication Data

US 2013/0312509 A1 Nov. 28, 2013

Related U.S. Application Data

(60) Provisional application No. 61/650,530, filed on May 23, 2012.

(51) Int. Cl.
| | |
|---|---|
| *B60C 23/02* | (2006.01) |
| *B60C 23/04* | (2006.01) |
| *G01L 17/00* | (2006.01) |
| *B60C 23/20* | (2006.01) |

(52) U.S. Cl.
CPC ............. *B60C 23/0486* (2013.01); *B60C 23/04* (2013.01); *G01L 17/00* (2013.01); *B60C 23/20* (2013.01); *B60C 23/0401* (2013.01); *B60C 23/0479* (2013.01); *B60C 23/0491* (2013.01)

(58) Field of Classification Search
None
See application file for complete search history.

(56) References Cited

U.S. PATENT DOCUMENTS

| | | |
|---|---|---|
| 3,719,936 A | 3/1973 | Daniels et al. |
| 4,235,184 A | 11/1980 | Schiavone |
| 5,481,904 A | 1/1996 | Fleck, Sr. et al. |
| 5,532,679 A | 7/1996 | Baxter, Jr. |
| 5,654,692 A | 8/1997 | Baxter, Jr. et al. |
| 6,082,192 A | 7/2000 | Koch et al. |
| 6,360,594 B1 | 3/2002 | Koch et al. |
| 6,516,660 B1 | 2/2003 | Koch et al. |
| 6,543,277 B2 | 4/2003 | Koch et al. |
| 6,722,191 B2 | 4/2004 | Koch et al. |
| 6,910,372 B2 * | 6/2005 | Wilson ........................ 73/146.5 |
| 8,157,172 B2 | 4/2012 | Fenkanyn |
| 2004/0140042 A1 * | 7/2004 | Teratani et al. ............ 156/110.1 |
| 2004/0182146 A1 * | 9/2004 | Wilson ......................... 73/146.2 |
| 2014/0150542 A1 * | 6/2014 | Townsend et al. ............. 73/146 |

FOREIGN PATENT DOCUMENTS

WO    WO2005/047029    5/2005

* cited by examiner

*Primary Examiner* — Andre Allen
(74) *Attorney, Agent, or Firm* — Greenberg Traurig, LLP (57) ABSTRACT

A system and method for measuring, recording and reporting vehicle tire temperatures and/or pressures. In one aspect, a sensing device including a convex protective vessel, with pressure and/or temperature sensors enclosed therein. The sensing device is dropped freely within the interior of a tire prior to rim mounting. A movement sensor can also be included in the sensing device. The protective vessel, including all sensors, is not attached or connected in any way to the vehicle tire, rim, or valve stem such that the sensing device is independent of the vehicle tire, rim, and valve stem, and moves freely within the interior of the tire. A balancing set including a dummy device, substantially equal in weight to a sensing device, and means for connecting the dummy device to the sensing device at 180 degrees separation around the tire may also be employed.

21 Claims, 12 Drawing Sheets

FIG. 4
CROSS SECTION OF 10

TIRE MONITORING APPARATUS, SYSTEM AND METHOD OF USING THE SAME

CROSS-REFERENCE

This application claims the benefit of U.S. Provisional Patent Application Ser. No. 61/650,530 filed on May 23, 2012 which is incorporated herein by this reference for all purposes.

FIELD OF INVENTION

This invention relates to tire pressure and/or temperature measurements; and more particularly to systems and methods for measuring, recording and reporting off-the-road vehicle tire temperatures and/or pressures.

BACKGROUND OF THE INVENTION

Off-the-road vehicle tires, particularly those of earth moving and mining vehicles, carry very heavy loads and are subject to costly, premature failure unless proper inflation is maintained. If the tire pressure of these off-the-road vehicles is too high, early tire blowout could occur. If tire pressure is too low, excess heat may be generated and cause tread separation, resulting, in some cases, in tire life being reduced to one-third of that possible with proper maintenance.

There are previously known systems and methods for sensing tire pressure and temperature. Many involve fixed attachment of sensors to a tire rim, either inside or outside, the attachment of sensors over a hole in the tire rim, or by sensor attachment to the tire valve stem. Unfortunately, the prior art involves systems that are too heavy, made of materials that might erode the inner surfaces of the tire material, weaken the rim, require fixed attachment to the metal part of the wheel, require expensive field retrofitting of the rims, cause inconvenience and time during tire replacement, or simply encumber use of the valve stem, all of which can add lost time during vehicle maintenance.

There is a need in the art for an operable and accurate tire pressure and temperature monitoring system that does not require tire rim retrofitting, tire rim weakening, excessive cool down periods for accurate measurements and does not cause any harm to the inner surfaces of the tire all the while providing accurate measurements, and is easily and readily transferable among various tires and vehicles, both off-the-road and on-road.

SUMMARY OF THE INVENTION

The embodiments of the present invention provide a system and method for measuring, recording and reporting vehicle tire temperatures and/or pressures that satisfy the needs articulated above. In one embodiment of the present invention, a tire pressure and temperature measurement system involves a sensing device including a protective vessel, shaped as a convex polytope, polyhedron or a spheroid, and pressure and temperature sensors, together with a battery powered telemetry transmitter, housed within the protective vessel. The sensing device is dropped freely within the interior of a tire prior to rim mounting. A movement sensor can also be included in the sensing device. The protective vessel, including all sensors, is not attached or connected in any way to the vehicle tire, rim, or valve stem. The sensing device is independent of the vehicle tire, rim, and valve stem, and moves freely within the interior of the tire.

The telemetry transmitter includes, in one embodiment, battery capacity sufficient to exceed the life of the tire. In one embodiment of the present invention, a telemetry receiver receives pressure and temperature data transmitted from inside the tire and conveys digital data to a processor and network for temperature and/or pressure display for one or all tires of a vehicle. The display can be in the vehicle, in a manager location, or in any chosen remote location. Additionally, various alert signals can be selectively provided to persons of interest, the alert signals involving the respective tire pressure, temperature, and/or vehicle movement. The system of the embodiments of the present invention can rely on various wireless two-way communication networks to bridge the physical gap between the elements of the system, according to an availability of existing communications infrastructure at the point of use.

In one embodiment of the present invention, the protective vessel is shaped as a convex polytope, polyhedron, or a spheroid. The protective vessel can be made of mesh structured material to allow cushioning and force/acceleration dumping to the sensors housed inside while allowing full exposure of the device within to the tire's air chamber atmosphere, thus retaining the respective shape design under pressure, and without losing the properties of its protective features. In another embodiment of the present invention, the protective vessel can employ an outer abrasion protective flexible elastic skin (or employ an additional outer abrasion protective flexible elastic skin) for use in circumstances where the vehicle's tire/rim has rough inner surfaces.

Further, the embodiments of the present invention provide a balancing set for use when tires of a respective vehicle may need dynamic balancing (as for steering front wheels of on-the-road cars or trucks) when the protective vessel with internal sensors is included within the tire. Balancing sets would most likely only be needed with on-the-road vehicles, where vehicle velocity is high, tire inertia is lower, and centrifugal forces on the internal protective vessel warrant balancing. The balancing set includes one sensing device 10 (including protective vessel 12 and internal sensors and components) and a dummy device of similar shape, size and/or weight. The dummy device is held opposite of the sensing device, relative to a tire center point, along a diametric plane through the center point, within the tire, using a flexible, soft, adjustable strap/coil. The strap/coil is sized in according to tire size, providing a balancing of additional weight, created by employment of the sensing device, across the tire diameter.

Other variations, embodiments and features of the present invention will become evident from the following detailed description, drawings and claims.

DETAILED DESCRIPTION OF THE INVENTION

For the purpose of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would normally occur to one skilled in the relevant art and having possession of this disclosure, are to be considered within the scope of the invention claimed.

The embodiments of the present invention relate to a system and method for measuring, recording and reporting vehicle tire temperatures and/or pressures. In one embodiment of the present invention, a tire pressure and temperature measurement system involves a sensing device including a convex protective vessel that encloses and protects a pressure and/or temperature sensor therein, together with a battery powered transmitter. The sensing device is dropped freely within the interior of a tire prior to rim mounting. A movement sensor can also be enclosed within the protective vessel of the sensing device. The sensing device, including protective vessel and all sensors, is not attached or connected in any way to the vehicle tire, rim, or valve stem. The sensing device is independent of the vehicle tire, rim, and valve stem, loosely residing and freely moving within the interior of the tire.

Figure 1A:
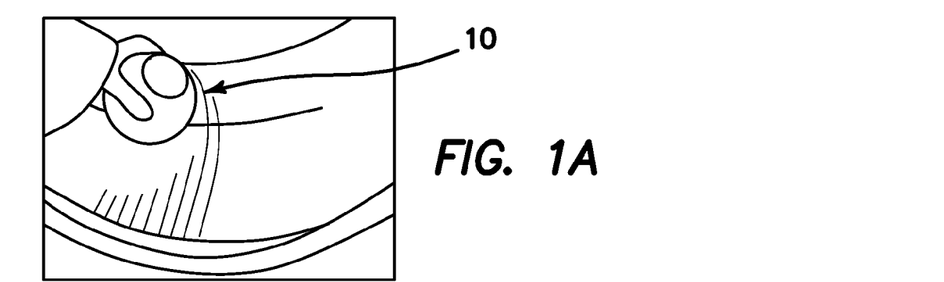
FIGS. 1A-1C illustrate an exemplary sensing device according to the embodiments of the present invention.
Figure 1B:
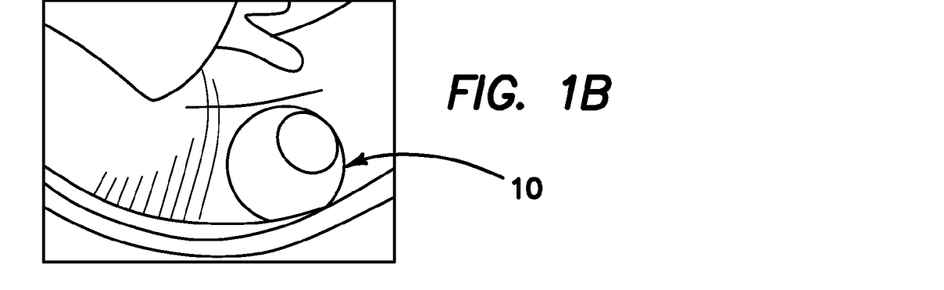
Figure 1C:
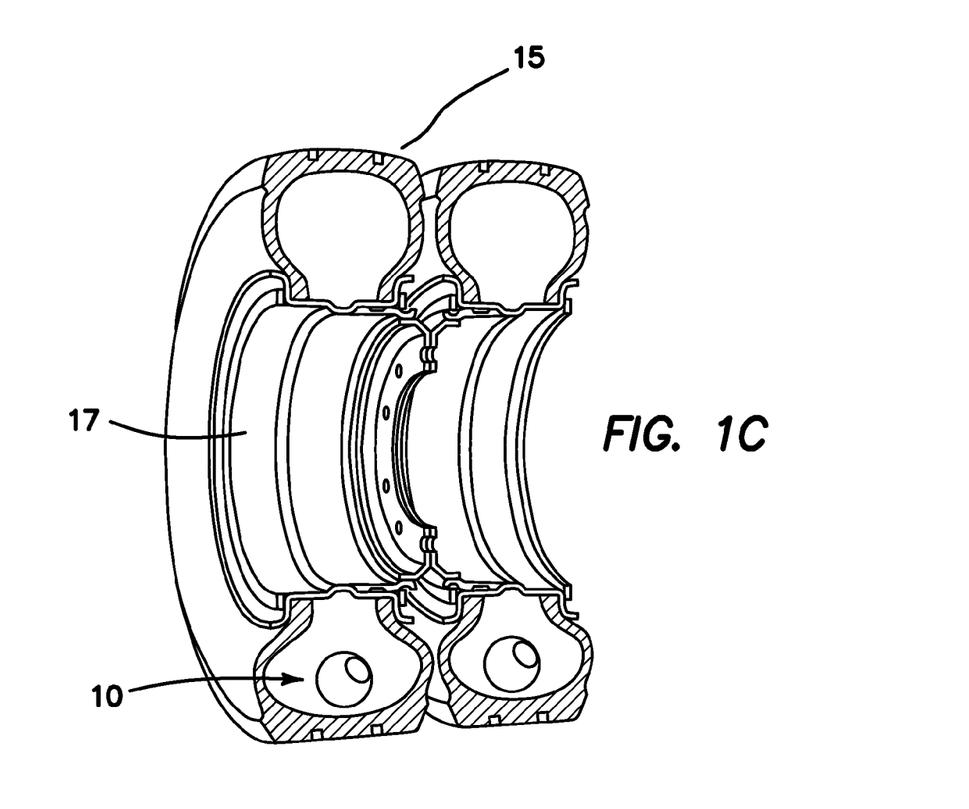

FIGS. 1A-1C show one embodiment of the present invention in which a generally spherical sensing device 10, including a protective vessel 12 that encloses and protects a pressure and temperature sensor(s) (not shown), and a digital data transceiver (not shown), all of which are simply dropped inside a tire when it is installed on the vehicle as shown in FIG. 1C. The sensing device 10 shown in FIGS. 1A and 1B is spherical having a diameter of about 5 inches. The sensing device 10, including protective vessel 12 and all internal components, is independent of the vehicle tire, rim, and valve stem, the sensing device 10 loosely residing and freely moving within the interior of the tire. FIG. 1C shows the sensing device 10 enclosed within the tire 15 which is then positioned on a rim 17. The sensing device 10, therefore, is configured to monitor and measure parameters of the interior of the tire without any component thereof being fixed to, or having a fixed attachment point to, the vehicle tire, rim, or valve stem. The sensors can employ any known technology; for example, Wi-Fi, or active or passive RFID. The sensing device 10, including protective vessel 12, may be shaped like a ball, a football, a convex polytope, polyhedron or a spheroid, or any other suitable shape that does not damage the interior of the tire and protects the sensors and components inside the protective vessel 12.

Accordingly, the sensing device 10, protective vessel 12 and internal components provide for the taking of measurements from within a closed confinement (e.g., measuring temperature and/or pressure of the air chamber of a tire) without compromising the integrity (physically, structurally and configuration) of the inner surfaces. In one particular instance, the embodiments of the present invention are directed to measuring values of temperature and/or pressure of the tire air chamber of mining trucks and heavy duty, off-the-road earth moving vehicles.

Figures 2A, 2B, 3:
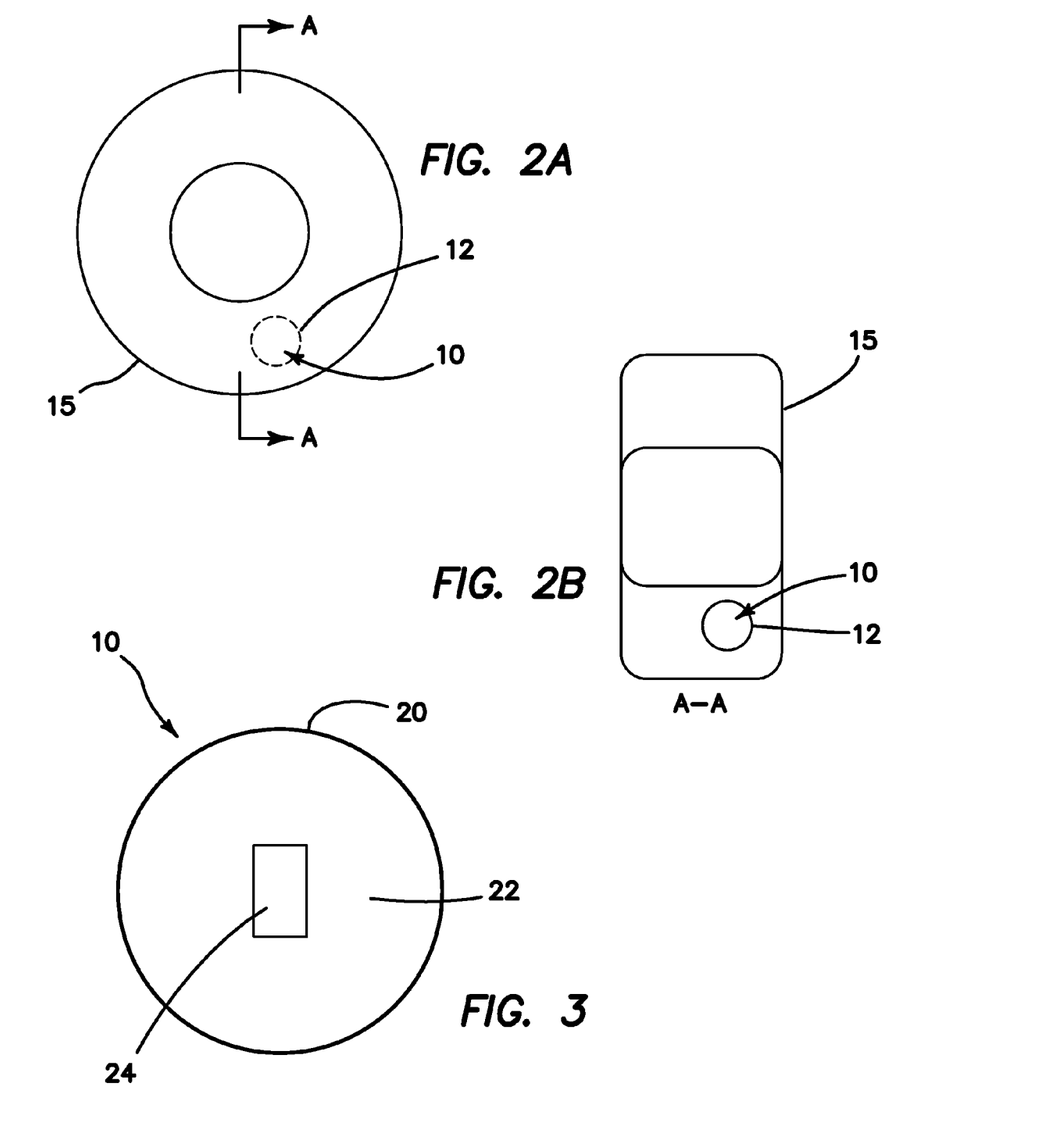
FIGS. 2A-2B illustrates cross-sectional views of a tire with the sensing device therein according to the embodiments of the present invention.
FIG. 3 illustrates a cross-sectional view of one sensing device according to the embodiments of the present invention.

FIGS. 2A-2B show cross-sectional views of the tire 15 with the protective vessel 12 of the embodiments of the present invention positioned therein. Generally, the sensing device 10 provides for the measuring of parameters within the respective closed space and allows the transfer of said parameters to a remote location via wireless components enclosed and protected within the protective vessel 12 of the sensing device 10. In certain embodiments, as shown in FIG. 3, the protective vessel 12 includes an outer layer 20 and a separate inner compound 22 which houses the electronic components, including, but not limited to, sensors and transmitters 24. In one embodiment, the outer layer has a hardness of not more than twice that of the inner layer of the tire to prevent mechanical harm to the inner surfaces of the tire. In other embodiments, the protective vessel 12 may not include both a separate outer layer 20 and inner compound 22, but might only include one protective compound layer. Those skilled in the art will recognize that any article capable of protecting the electronic components while not causing damage to the inner surfaces of the tire and allowing wireless signals to be transmitted therefrom may be employed as a protective vessel. Use of both an outer layer 20 and separate inner compound 22 for the protective vessel 12 may be found more facilitative when the embodiments of the present invention are employed on smaller, on-the-road vehicle tires, where greater acceleration and centrifugal forces can dictate the further, protective outer layer.

Figure 4:
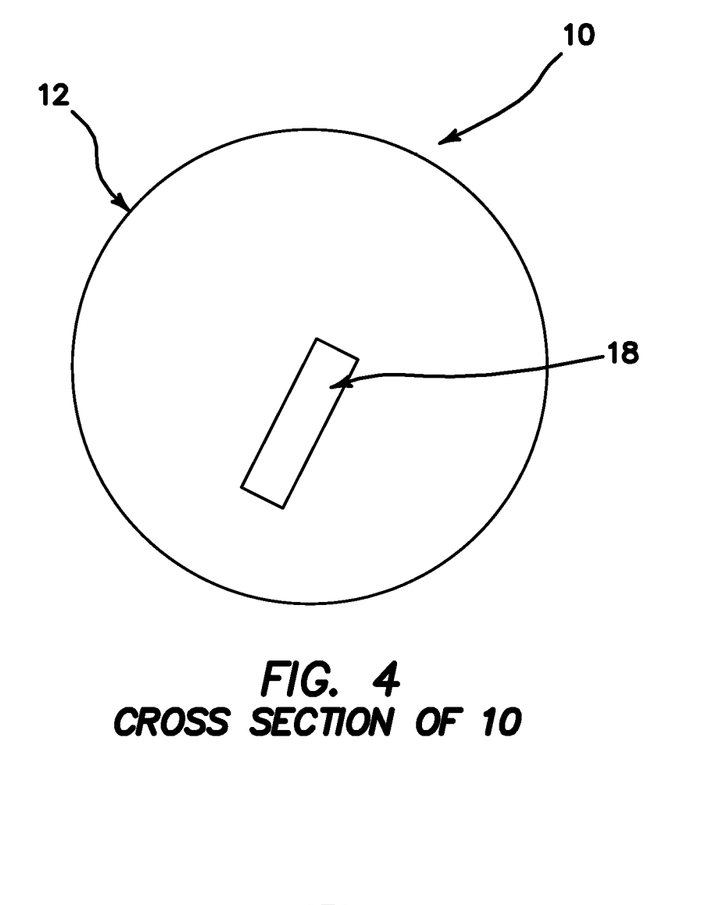
FIG. 4 illustrates a specific embodiment of the sensing device according to the embodiments of the present invention.
Figure 5:
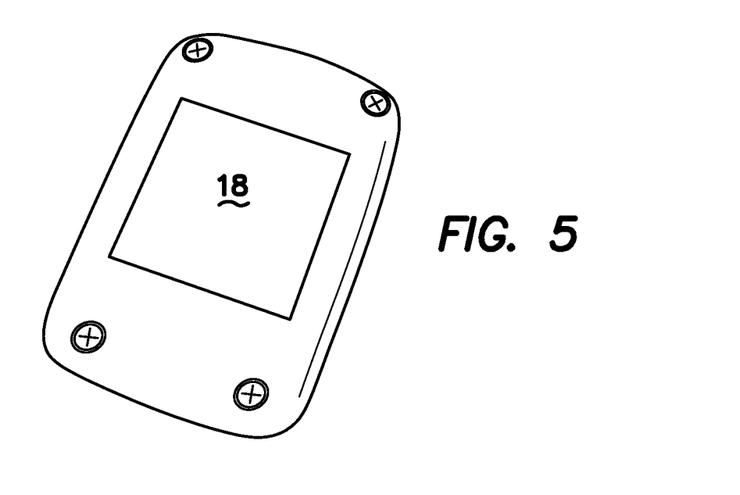
FIG. 5 illustrates an exemplary Wi-Fi tag suitable for the sensing device according to the embodiments of the present invention.

One specific embodiment of the sensing device 10 of the present invention is illustrated in FIGS. 4 and 5. In this embodiment, the protective vessel 12 (see FIG. 4) provides a sphere-like protective compound layer (an environment shroud) for modified Wi-Fi tags (modified to measure temperature and pressure, and additionally movement, if desired) against the mechanical and physical dynamic forces and associated accelerations occurring within the air chamber of the tire. Additionally, the composition of the protective vessel 12, while providing the necessary protections, allows the modified Wi-Fi tags therein (not shown in FIG. 4) to be exposed to the actual pressure and temperature conditions occurring within the air chamber of the tire. That is, the protective vessel 12 (in this embodiment a protective compound layer) is composed of soft, spongy, elastic, material having a porosity that allows the actual pressure and temperature conditions of the tire air chamber to penetrate the protective vessel 12 and be accurately measured by the modified Wi-Fi tags therein. In this specific embodiment, the FIG. 4 protective vessel 12 comprises a protective compound layer similar to the inner compound detailed in FIG. 3.

One exemplary modified Wi-Fi tag 18 of the FIGS. 4 and 5 sensing device 10 is illustrated in FIG. 5, and could be an AeroScout™ T5 Sensor Tag (e.g., TAG 5100-C). In this embodiment, the protective vessel 12 does not provide a cover for the Wi-Fi tags—the tags are complete with a cover—the protective vessel 12 protects the internal components of the sensing device 10 from the mechanical and physical dynamic forces and associated accelerations occurring within the air chamber of the respective tire.

Accordingly, in certain embodiments of the present invention, the protective vessel 12 can be described as a "soft glove," so to speak, where the desired electronics are inserted therein, embraced by the spongy, highly porous and elastic material of the protective vessel 12, where the protective vessel 12 provides compressibility, heat tolerance and fire resistance. In this embodiment of the present invention, no holes need be bored through a rigid outer casing of the protective vessel 12, because the composition of the protective vessel 12 provides that the atmospheric conditions surrounding the protective vessel 12 penetrate the vessel to communicate directly with the internal electronics. The air chamber within a respective tire often experiences high G-forces. During high G-forces, acceleration is delivered to the protective vessel 12. The protective vessel 12 of the present invention absorbs the high G-forces and allows the internal electronics to accurately perform unhampered. The design of the protective vessel 12 of the embodiments of the present invention results in a very light weight assembly, resulting in insignificant mechanical forces acting on the inner surfaces thereof.

Figure 6:
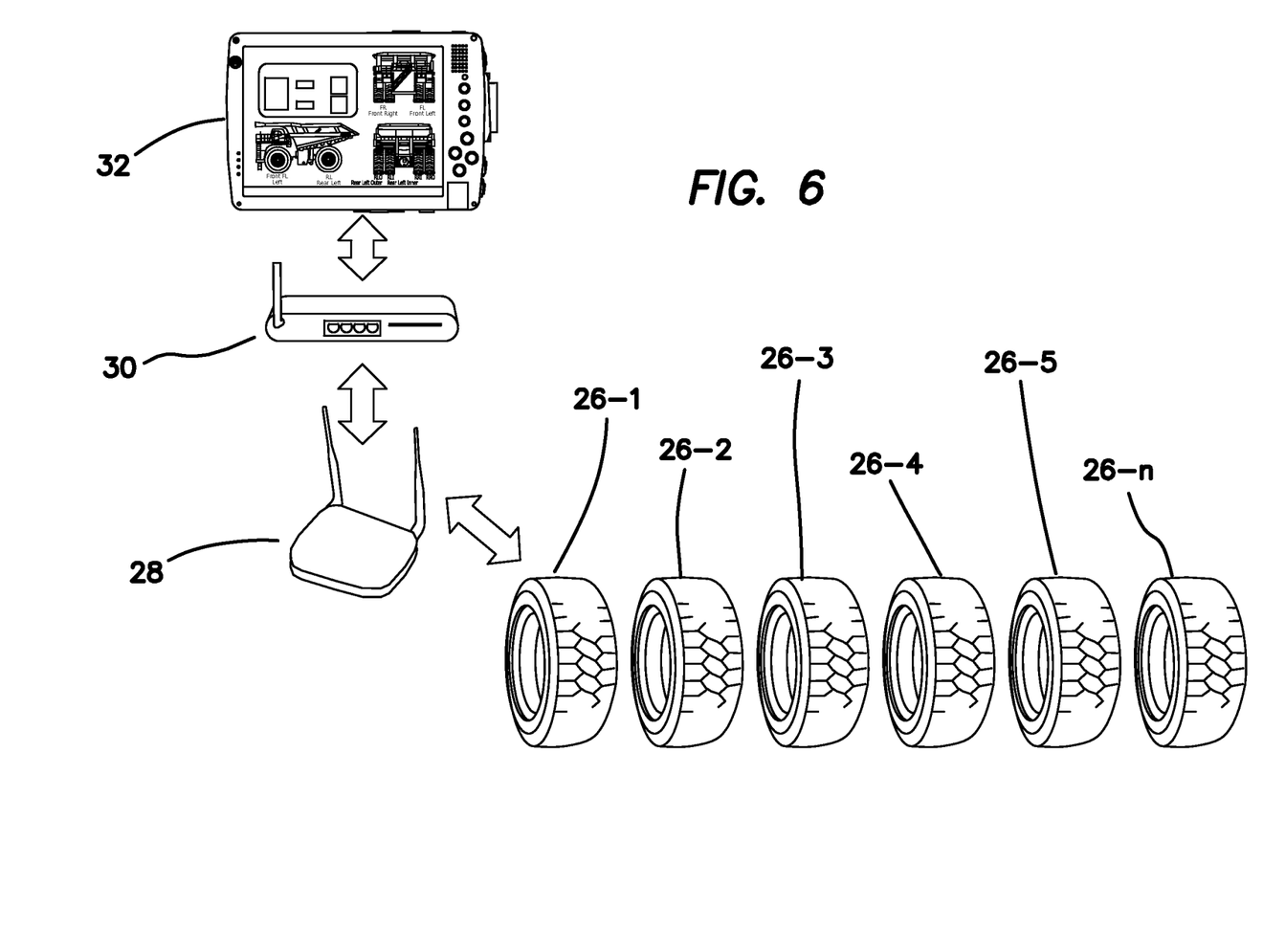
FIG. 6 illustrates an overall system configuration according to the embodiments of the present invention.

Wireless transmission from the sensing device 10 from within an air chamber of a tire, to a network, can be accomplished by any known and reliable wireless technology; for example Wi-Fi, ZigBee® and RF. In one embodiment of the present invention, Wi-Fi is employed as the reader network. Off-the-shelf Wi-Fi systems operate adequately. A receiver configured for outdoor, wide-open or harsh environments may be desired. One exemplary receiver is the AeroScout™ Location Receiver as shown in FIG. 6.

For relaying data from the location receiver to and from the application server can be by any known and reliable wireless technology; for example Wi-Fi, cellular and RF. In one embodiment of the present invention, cellular is employed. A cellular modem connects the Wi-Fi access point to the application server. See FIG. 6, illustrating wireless transmission from a sensing device 10 within each tire 26-1 through 26-$n$, to a Wi-Fi receiver 28, to a cellular modem 30, to an application server and various display interfaces 32.

Figure 7:
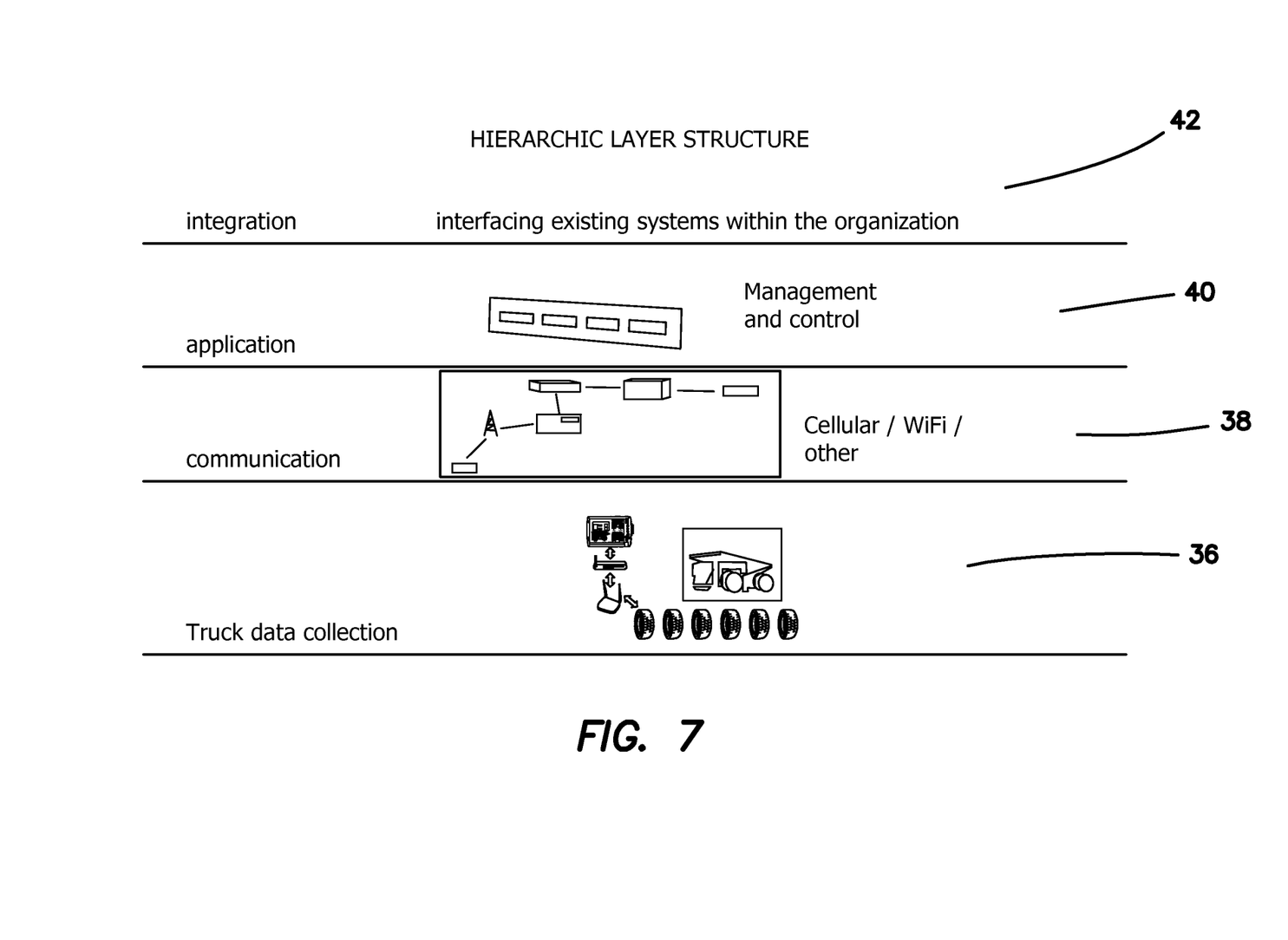
FIG. 7 illustrates a hierarchical layer structure involving the transmitted tire data according to the embodiments of the present invention.

The embodiments of the present invention include application software and a database, developed for display of the sensed data in a manner useful for the market needs. The software of the embodiments of the present invention is designed to allow easy integration into existing managing and controlling software currently used by mining companies, for example, either in their vehicles or at their control rooms, as well as displayed on employed PDA or similar devices. For example, as shown in FIG. 7, the tire data collection 36 is communicated 38 to a management and control application 40 which is interfaced 42 for use by personnel at the entity.

Figure 9:
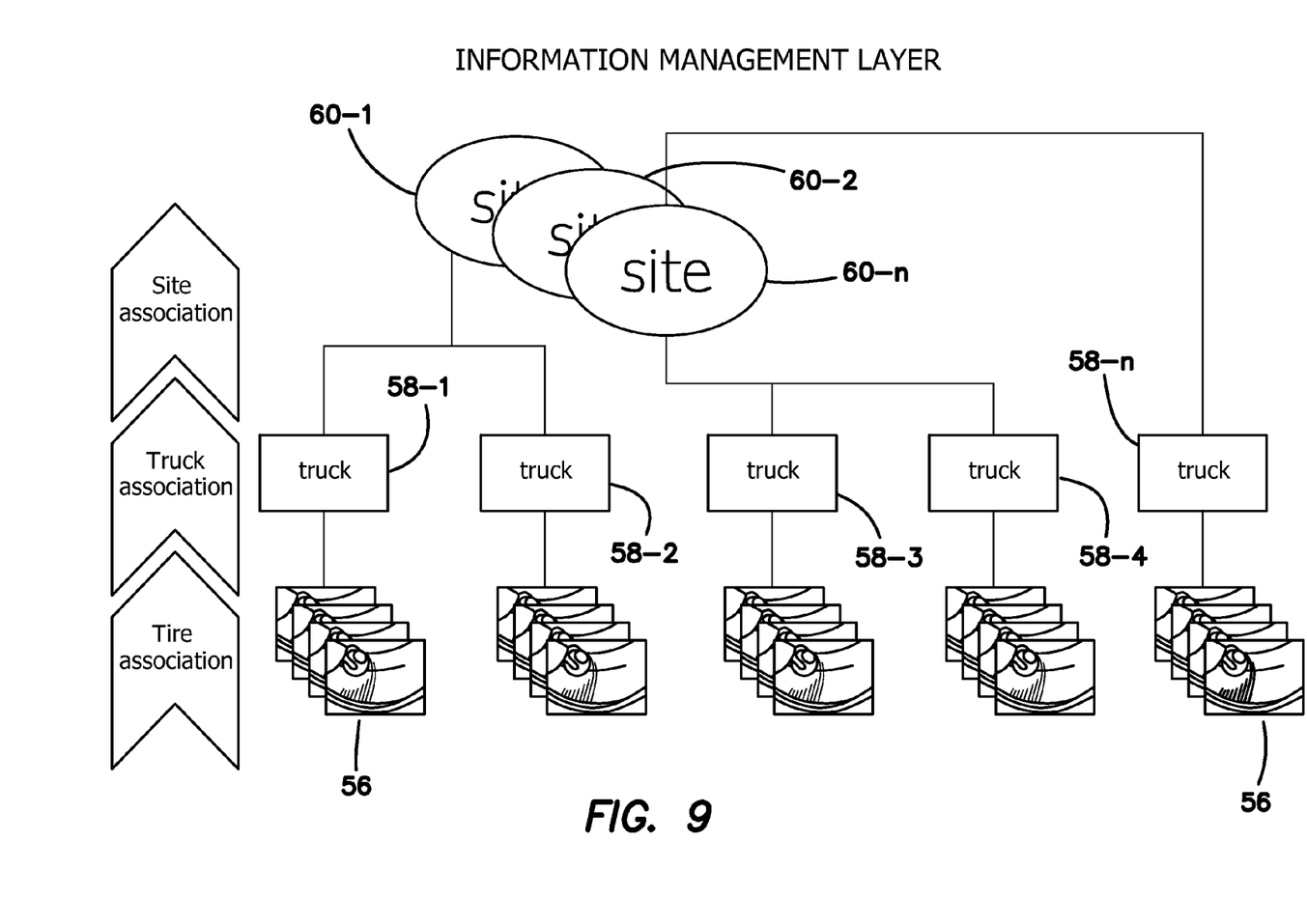
FIG. 9 illustrates a management layer associated with the system according to the embodiments of the present invention.
Figure 10:
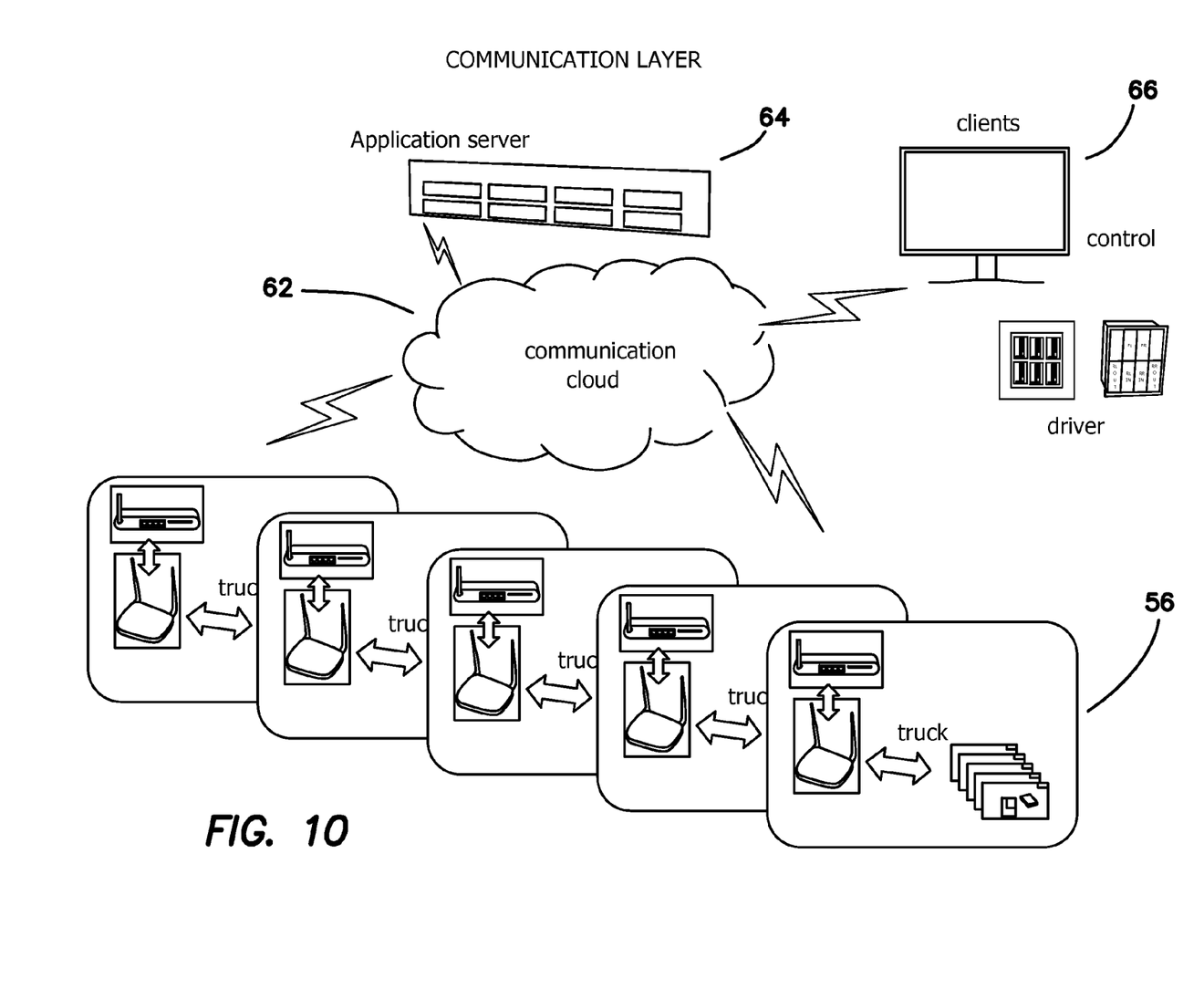
FIG. 10 illustrates a communication layer associated with the system according to the embodiments of the present invention.

In one embodiment of the present invention, software associates an individual sensing device 10 with a respective tire, associates all tires of a truck with the respective truck, and associates each truck at a site with the respective site. This information management layer integrates with the existing managing and controlling software currently used by mining companies, for example, with the forwarding of this associated data to selected client locations with display interfaces as shown in FIGS. 8-10.

Figure 8:
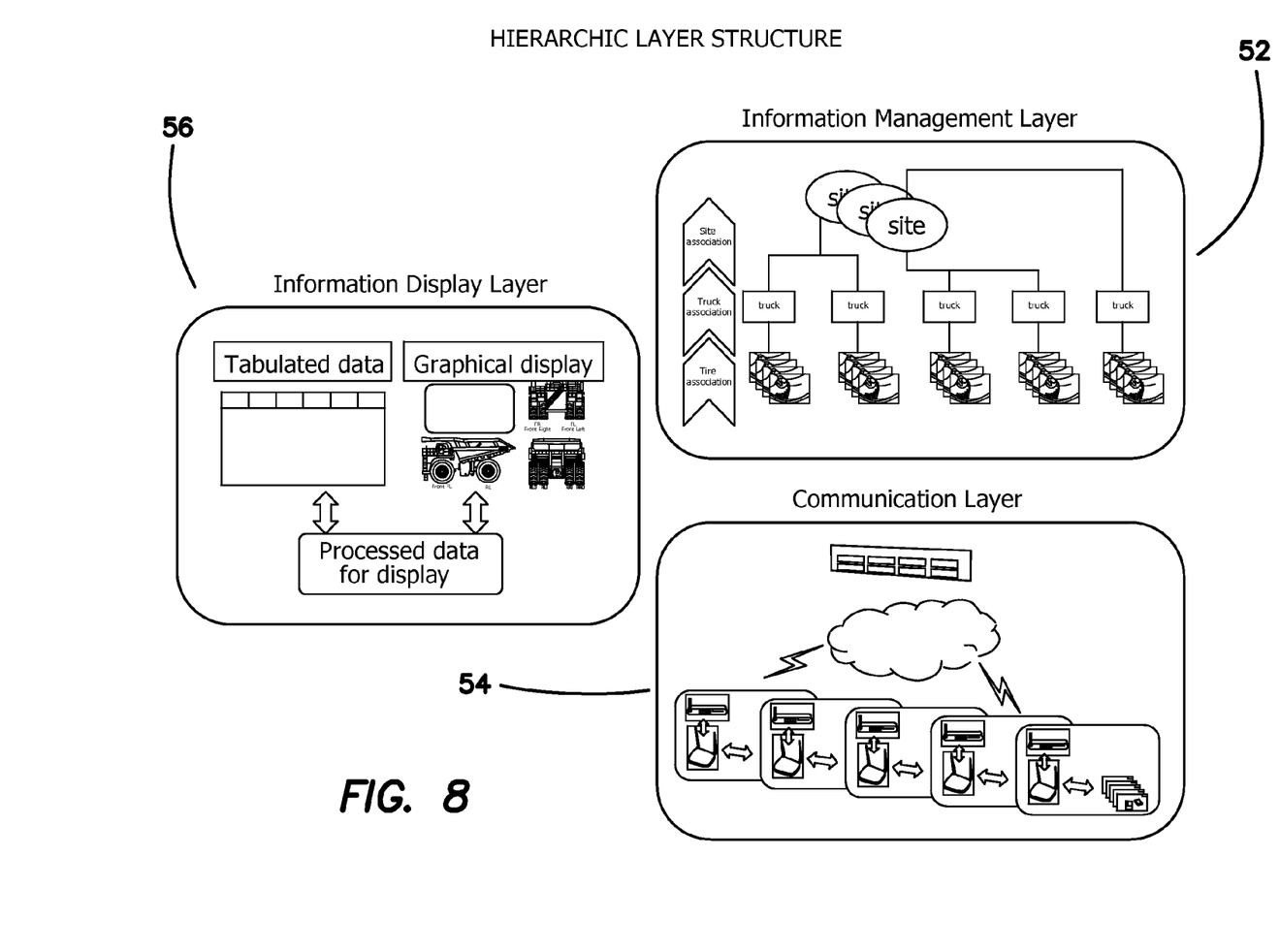
FIG. 8 illustrates a structure of an exemplary system according to the embodiments of the present invention

FIG. 8 shows a structure of an exemplary system 50 according to the embodiments of the present invention. The exemplary system 50 comprises an information management layer 52, communication layer 54 and information display layer 56. As shown in FIG. 9, the information management layer 52 includes tire data 56 from a series of tire associated with each truck 58-1 through 58-$n$ which is further associated with each site 60-1 through 60-$n$. As shown in FIG. 10, the communication layer 54 includes tire date 56 being transmitted to the cloud 62 which provides access to an application server 64 and clients 66.

Figure 11:
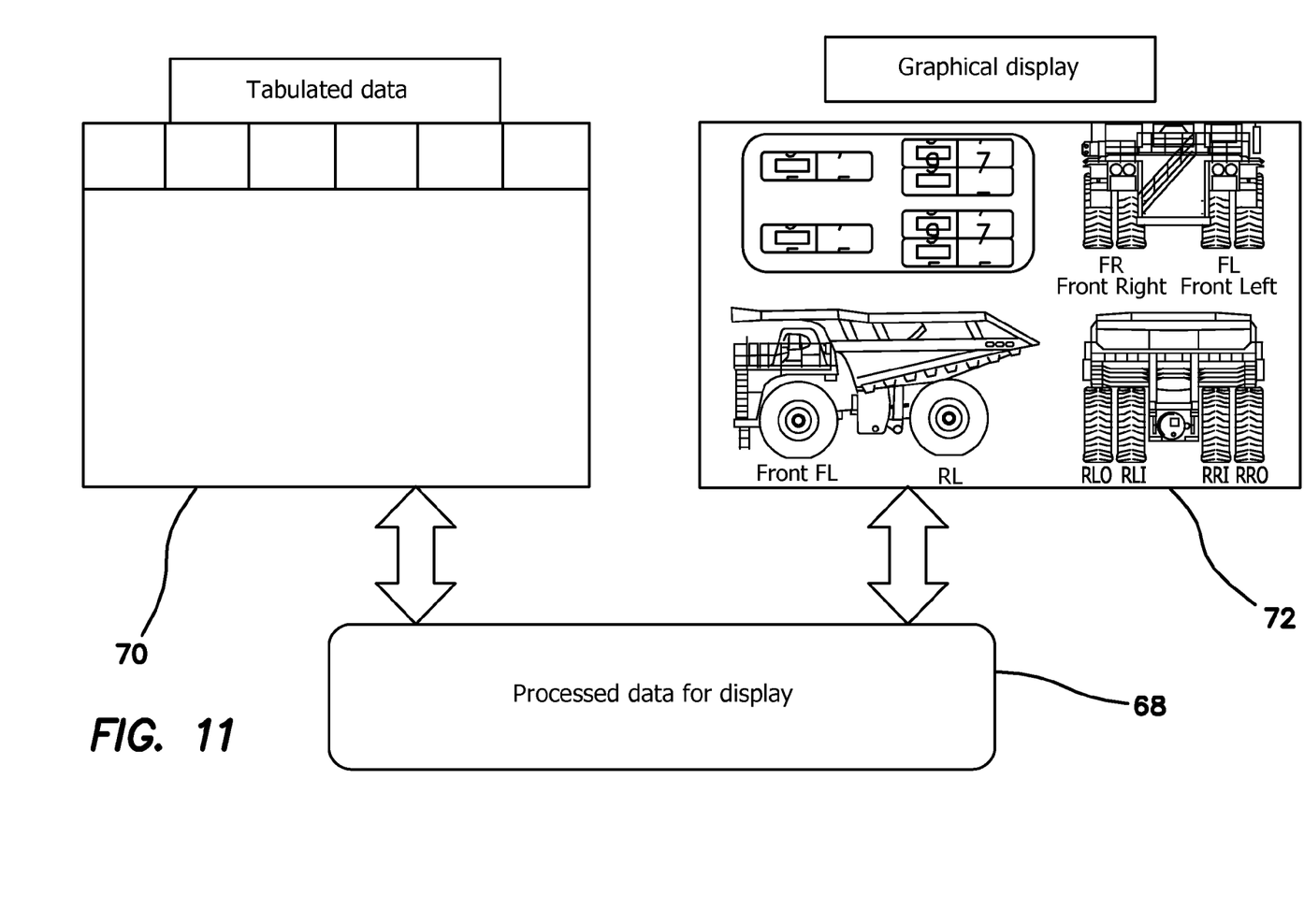
FIG. 11 illustrates an information display layer associated with the system according to the embodiments of the present invention.
Figure 12:
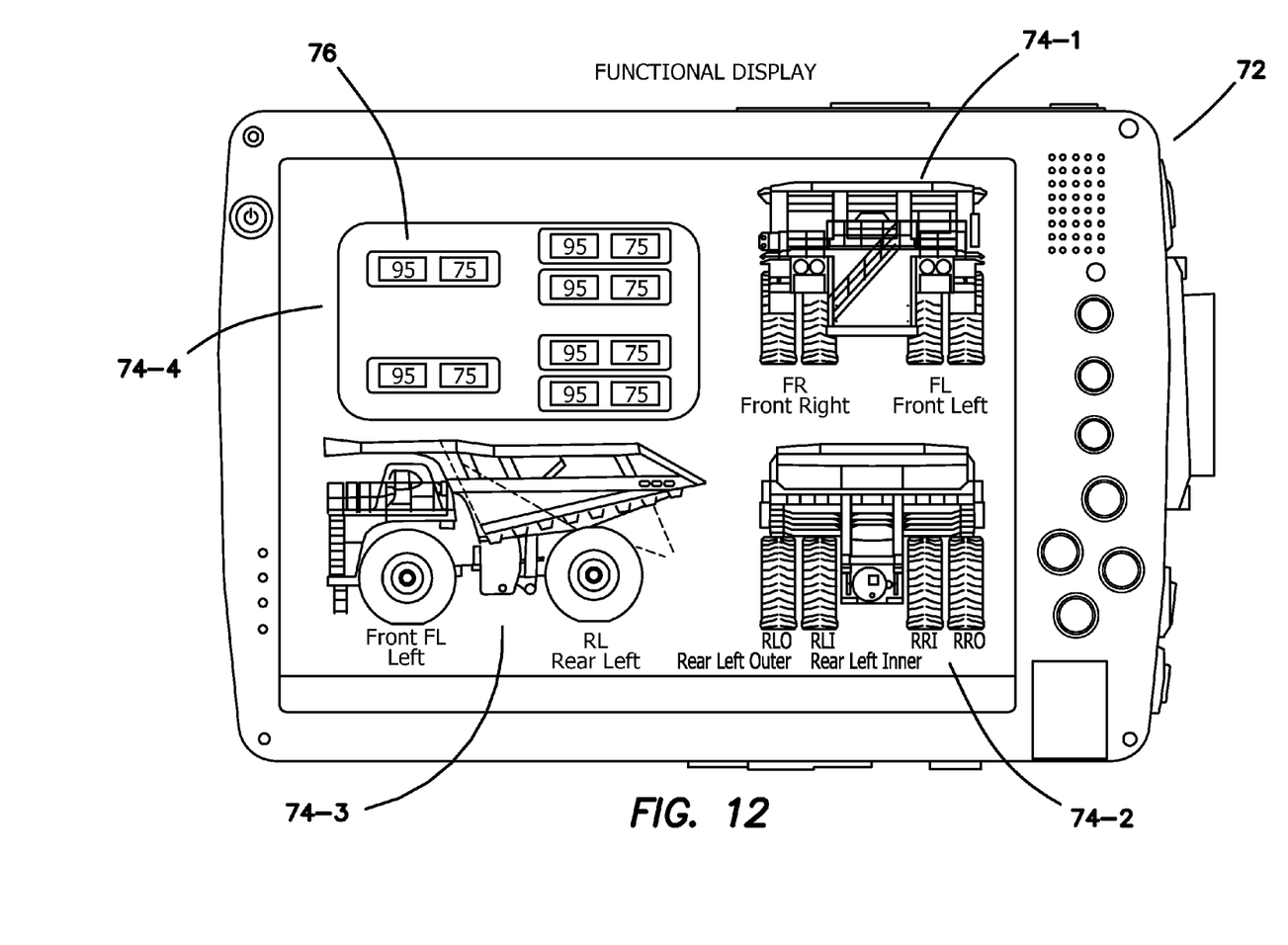
FIG. 12 illustrates a functional display configured to display tire data according to the embodiments of the present invention.

In one embodiment of the present invention, as shown in FIG. 11, the information display layer 56 utilizes software 68 to process tabulated digital data 70 received for display (e.g., temperature and pressure data for multiple tires of various trucks at one or more site locations) and presents the data in a graphical display 72. One embodiment of an exemplary graphical, functional display 72 is shown in FIG. 12, where an individual truck is displayed (front 74-1, back 74-2 and side view 74-3), with identification of each tire thereon. A top view 74-4 of the truck is also shown (in the upper left corner of the display 72 shown in FIG. 12), showing a relative location of each tire of the truck, and providing the individual temperature and pressure readings 76 for each tire of the truck. This functional display 72 can be provided in the cab of each truck or at any client location.

Figures 13, 15A, 15B, 16:
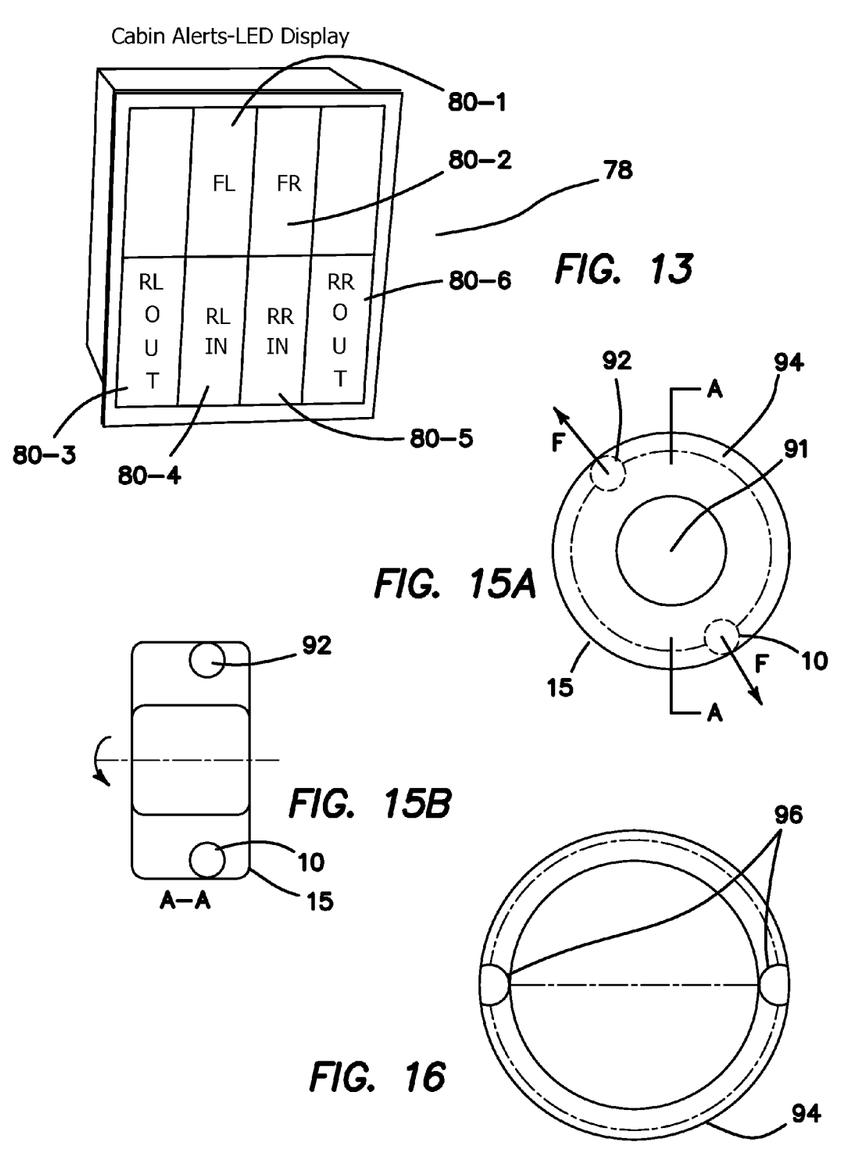
FIG. 13 illustrates an in-vehicle cabin alert display according to the embodiments of the present invention.
FIGS. 15A-15B illustrate cross-sectional views of a tire with a sensing device and ballast positioned therein according to the embodiments of the present invention.
FIG. 16 illustrates a device for balancing a dummy device (ballast) and sensing device within a tire according to the embodiments of the present invention.

In another embodiment of the present invention, an alarm alert LED display 78 can be provided a shown in FIG. 13. The LED alarm display 78 of FIG. 13 illustrates a 6-tire truck and provides a single LED 80-1 through 80-6 for each tire (e.g. FL—front left; RL IN—rear left inside). Upon reaching (or falling below) a pre-determined threshold of temperature and/or pressure, the associated LED alarm alert initiates thus notifying the intended audience. An audio alarm might also be provided. The LED alarm alert can be a simple red light for problem condition, address immediately, and a green light for satisfactory operating conditions. The alarm alert LED display 78 can also be provided in the cab of each truck or at any client location.

Figure 14:
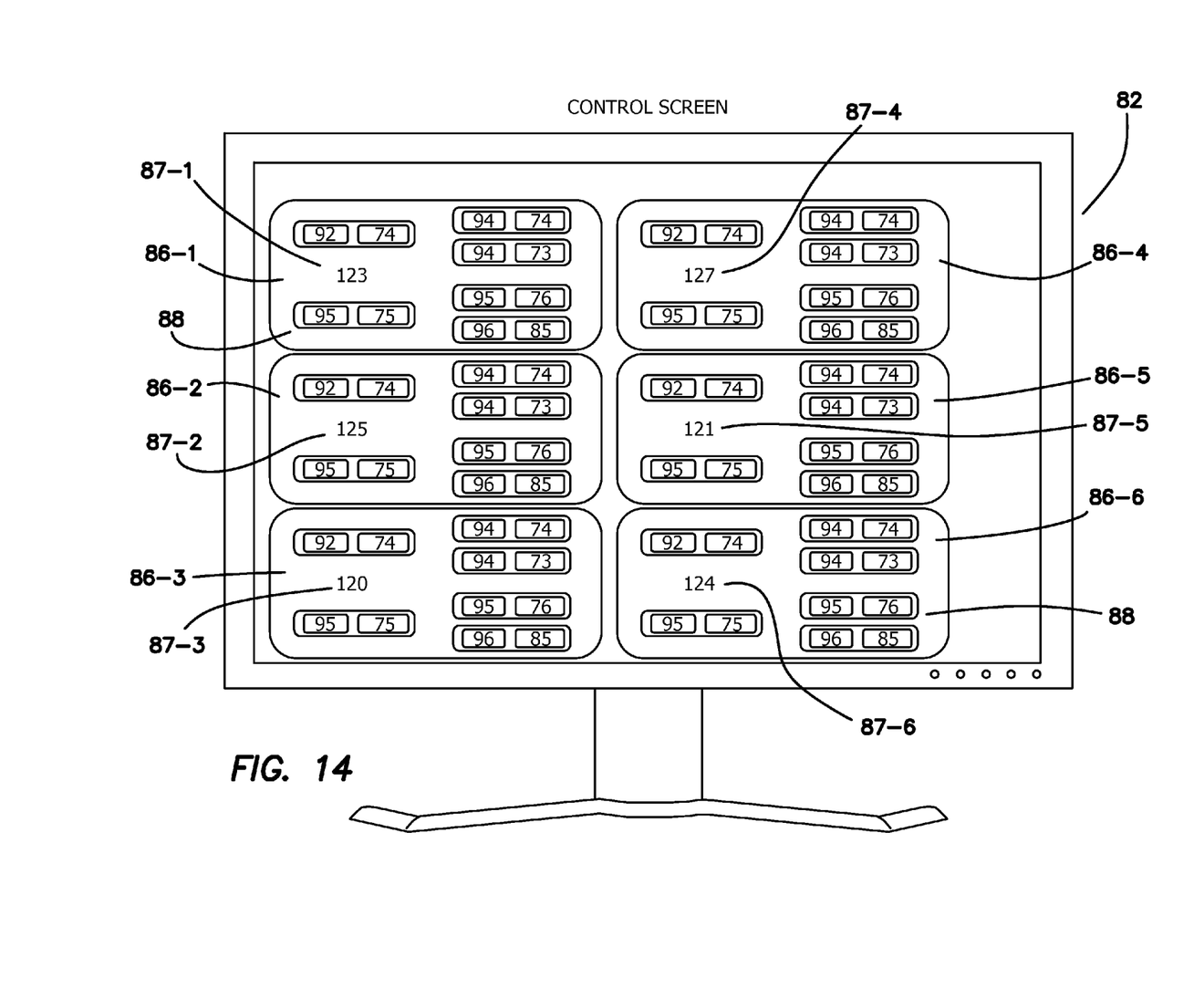
FIG. 14 illustrates a control screen event viewer according to the embodiments of the present invention.

In another embodiment of the present invention, a control screen event viewer 82 is provided. As shown in FIG. 14, each truck 86-1 through 86-6 displayed is identified by number 87-1 through 87-6, and includes a top view of each truck 86-1 through 86-6, showing a relative location of each tire of the truck, and providing the individual temperature and pressure reading 88 for each tire of the truck. The control screen event viewer 82 is likely desired a site manager client location.

In one or more embodiments of the present invention, a movement sensor can be added to the sensing device 10. The movement sensor is configured to detect any truck movement, and provide an alert that a respective truck is in service, or at least is in motion. The movement sensor can be particularly useful after hours, when the trucks are out of service. The software of the embodiments of the present invention can be configured to alert (e.g., by email, SMS) a site manager when a vehicle is in motion. An email or SMS might identify the truck number, the time, whether the truck is moving, and how long the truck has been moving. Alternatively, during working hours, the software can be configured to alert a site manager when a vehicle stops motion, or fails to move for a pre-determined time period (e.g., 10 minutes, 20 minutes). Alternatively, or in addition, movement sensor readings can be displayed on the functional display, the LED display, and/or the control screen event viewer. For example, an on-screen display might identify, by light indication on the respective truck display, whether the truck is in motion.

Further, as articulated above, the embodiments of the present invention provide a balancing set for use when tires of a respective vehicle may need dynamic balancing (as for steering front wheels of on-the-road cars or trucks) when the protective vessel with internal sensors is included within the tire. Balancing sets would most likely only be needed with on-the-road vehicles, where vehicle velocity is high, tire inertia is low, and centrifugal forces on the internal protective vessel warrant balancing. As shown in FIGS. 15A and 15B, the balancing set 90 includes one sensing device 10 (including protective vessel 12 and internal sensors and components) and a dummy device 92 of similar shape, size and weight. The dummy device 92 is held opposite of the sensing device 10, relative to a tire center point 91, along a diametric plane through the center point, within the tire, using a flexible, soft, adjustable strap/coil 94 (shown in FIGS. 15A and 16). The strap/coil 94 is sized according to tire size, providing a balancing of additional weight, created by employment of the sensing device 10, across the tire diameter. The strap/coil 94 is configured to run along the inner perimeter surface of the tire 15. The strap/coil 94 is configured to rest within the tire 15 without attachment thereto. Accordingly, at slow speeds, the strap/coil 94 tends to stay in place maintaining the 180 degrees separation between the sensing device 10 and dummy device 92 while at a higher speeds centripetal and centrifugal forces assist by forcing the sensing device 10 and dummy device 92 outwardly against the inner surface of the tire 15. As shown in FIG. 16, the balancing set 90 may further include cavities/compartments 96 positioned along the strap/coil 94 for containing the sensing device 10 and dummy device 92.

These and other advantages of the embodiments of the present invention will be apparent to those skilled in the art from the foregoing specification. Accordingly, it will be recognized by those skilled in the art that changes or modifications may be made to the above described embodiments without departing from the broad inventive concepts of the invention. Specific dimensions of any particular embodiment are described for illustration purposes only. It should therefore be understood that this invention is not limited to the particular embodiments described herein, but is intended to include all changes and modifications that are within the scope and spirit of the invention.

What is claimed is:

1. A sensing apparatus for measuring a pressure and/or a temperature of gases in an interior of a tire, comprising:
   a protective vessel configured to move freely within the interior of the tire;
   pressure and/or temperature sensors enclosed within the protective vessel and configured to sense a current pressure and/or a current temperature of the gases in the interior of the tire;
   a transmitter configured to wirelessly convey to outside the tire data indicative of the current pressure and/or current temperature of gases in the interior of the tire; and
   wherein the protective vessel is configured with a porosity and elasticity allowing the pressure and/or the temperature conditions in the interior of the tire to freely penetrate the protective vessel and communicate directly with the pressure and/or the temperature sensors.

2. The apparatus of claim 1, further comprising a receiver that receives the wirelessly conveyed data indicative of the current pressure and/or the current temperature of gases in the interior of the tire.

3. The apparatus of claim 2, further comprising a processor and display for processing the wirelessly conveyed data and displaying the current pressure and/or the current temperature of the gases in the tire.

4. The apparatus of claim 3, wherein the display is located in a vehicle employing the tire.

5. The apparatus of claim 1, further comprising a movement sensor enclosed within the protective vessel and sensing movement of the tire.

6. The apparatus of claim 1, wherein the protective vessel comprises a porous mesh structured material to allow cushioning and force and/or acceleration dumping to the sensors enclosed within the protective vessel while protecting the inner surface of the tire from mechanical harm.

7. The apparatus of claim 1, wherein the pressure and temperature sensors are Wi-Fi tags with internal transmitters.

8. The apparatus of claim 1, wherein the protective vessel comprises an outer layer and an inner compound.

9. The apparatus of claim 8, wherein the outer layer has a hardness of not more than twice that of the inner layer of the tire to prevent mechanical harm to the inner surfaces of the tire.

10. The apparatus of claim 1, wherein the protective vessel is shaped as a convex polytope, a convex polyhedron or a spheroid.

11. The apparatus of claim 1, wherein the sensing apparatus is configured to be dropped freely within an interior of the tire prior to rim mounting, and the sensing apparatus is configured to not attach to the tire, a rim of the tire, a valve stem of the tire or any part of a wheel assembly.

12. A method for measuring a pressure and/or a temperature of gases in an interior of a tire, comprising the steps of:
   enclosing pressure and/or temperature sensors within a protective vessel of a sensing device;
   inserting a sensing device within an interior of the tire, wherein the sensing device is free to move within the interior of the tire, without attachment to the tire, to a rim of the tire, or to a valve stem of the tire;
   sensing a pressure and/or a temperature of gas in the interior of the tire, wherein the protective vessel is configured with a porosity and elasticity allowing the pressure and/or the temperature conditions in the interior of the tire to freely penetrate the protective vessel and communicate directly with the pressure and/or the temperature sensors; and
   transmitting wirelessly data indicative of the pressure and/or the temperature of gases in the interior of the tire.

13. The method of claim 12, further comprising the step of receiving the data indicative of the pressure and/or the temperature of gases in the tire.

14. The method of claim 12, further comprising the step of receiving data indicative of any movement of the tire.

15. A sensing apparatus for measuring a pressure and/or a temperature of gases in an interior of a tire, comprising:
   an elastic, non-rigid protective vessel configured to be freely enclosed within the interior of the tire, and free from attachment to the tire, to a rim of the tire, or to a valve stem of the tire or any other internal part of a wheel assembly;
   pressure and/or temperature sensors enclosed within the protective vessel and configured to sense a pressure and/or a temperature of the gases in the interior of the tire; and a transmitter configured to wirelessly convey to outside the tire data indicative of the current pressure and/or the current temperature of gases in the interior of the tire.

16. The sensing apparatus of claim 15, further comprising a movement sensor enclosed within the protective vessel and sensing movement of the tire.

17. The sensing apparatus of claim 15, further comprising a porous mesh structured material to allow cushioning and force and/or acceleration dumping to the sensors enclosed within the protective vessel while protecting the inner surface of the tire from mechanical harm.

18. The sensing apparatus of claim 15, wherein the pressure and temperature sensors are Wi-Fi tags with internal transmitters.

19. The sensing apparatus of claim 15, further comprising an outer layer and an inner compound to prevent mechanical harm to the inner surfaces of the tire.

20. The sensing apparatus of claim 19, wherein the outer layer has a hardness of not more than twice that of the inner layer of the tire to prevent mechanical harm to the inner surfaces of the tire.

21. The sensing apparatus of claim 15, wherein the protective vessel is shaped as a convex polytope, a convex polyhedron or a spheroid.

* * * * *